United States Patent [19]

Reed

[11] Patent Number: 4,859,151

[45] Date of Patent: Aug. 22, 1989

[54] PUMP-OFF CONTROL FOR A PUMPJACK UNIT

[76] Inventor: John H. Reed, P.O. Box 837, Kermit, Tex. 79745

[21] Appl. No.: 145,385

[22] Filed: Jan. 19, 1988

[51] Int. Cl.⁴ .................. F04B 49/02; F04B 49/08
[52] U.S. Cl. .................................. 417/12; 417/43; 417/63; 417/53
[58] Field of Search ............... 260/81.9 R; 417/12, 417/44, 43, 53, 63

[56] References Cited

U.S. PATENT DOCUMENTS

| | | | |
|---|---|---|---|
| 2,853,575 | 9/1958 | Reynolds | 200/81.9 R |
| 3,559,731 | 2/1971 | Stafford | 417/12 |
| 4,118,148 | 10/1978 | Allen | 417/43 |
| 4,119,865 | 10/1978 | Elderton | 417/43 |
| 4,507,053 | 3/1985 | Frizzell | 417/43 |
| 4,744,729 | 5/1988 | Hasten | 417/12 |
| 4,749,925 | 6/1988 | Wilkins | 417/12 |

Primary Examiner—William L. Freeh
Attorney, Agent, or Firm—Marcus L. Bates

[57] ABSTRACT

A pump-off control for a pumpjack unit. The pumpjack unit has a flow line therefrom connected to a tank battery. A control device is connected in the flow line so that all of the production must flow therethrough. The control apparatus includes an orifice placed in the flow line and a bypass arranged for flow to occur around the orifice. A movable member is placed within the bypass and each stroke of the pumpjack moves the member in proportion to the quantity of liquid flowing therethrough. The movable member is connected to actuate a switch device, indicator, chart, and counter. The orifice is sized respective to the movable member so that each stroke of the pumpjace causes the movable member to move in proportion to the produced fluid forced through the bypass. The switch device is positioned to be actuated at a predetermined flow rate each stroke of the pump. The switch device actuates circuitry which causes the pumpjack unit to be shut-in whenever the cyclic flow is less than a predetermined amount, thereby avoiding fluid pounding and enabling the downhole pump to be operated at maximum efficiency.

12 Claims, 5 Drawing Sheets

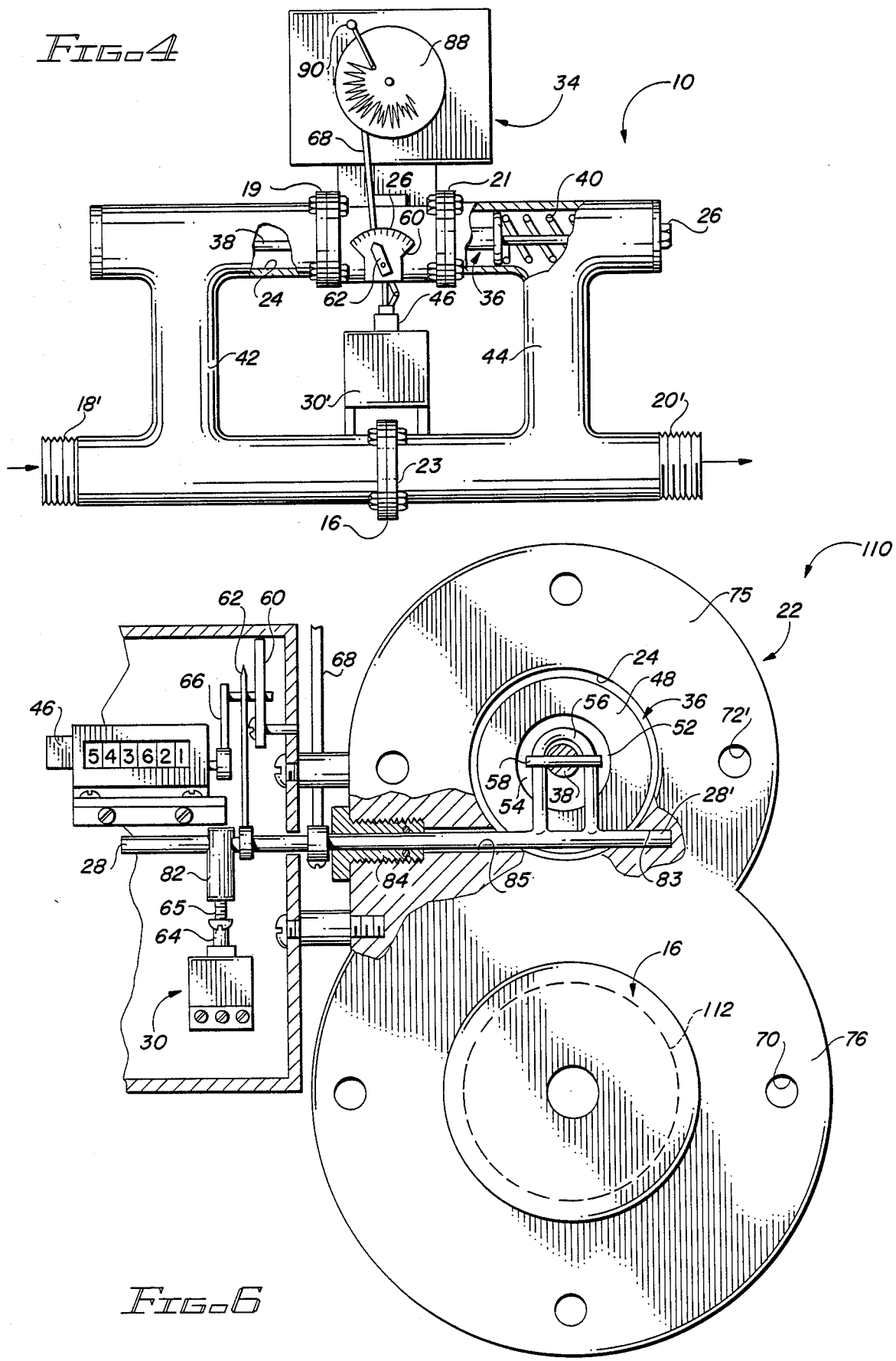

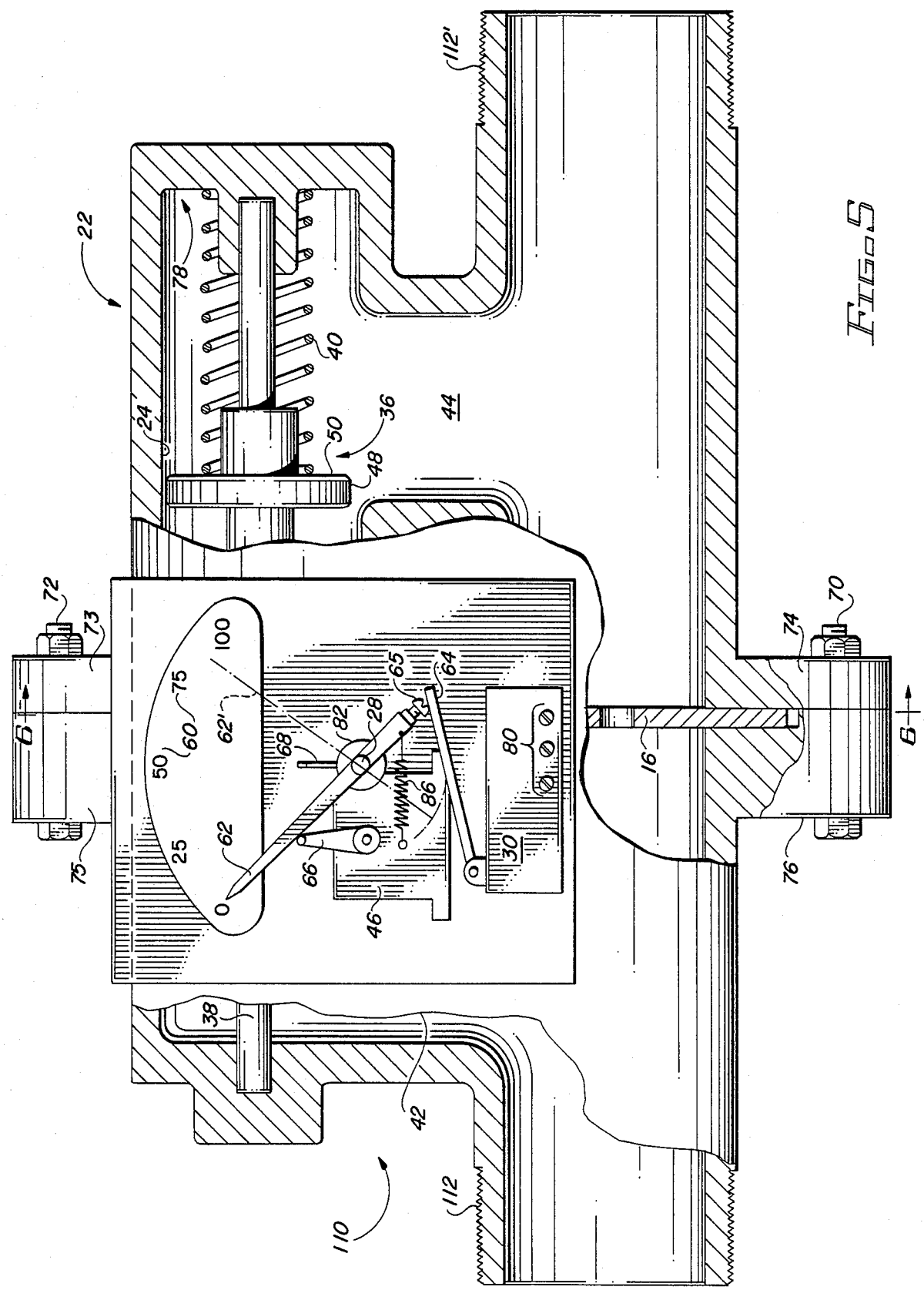

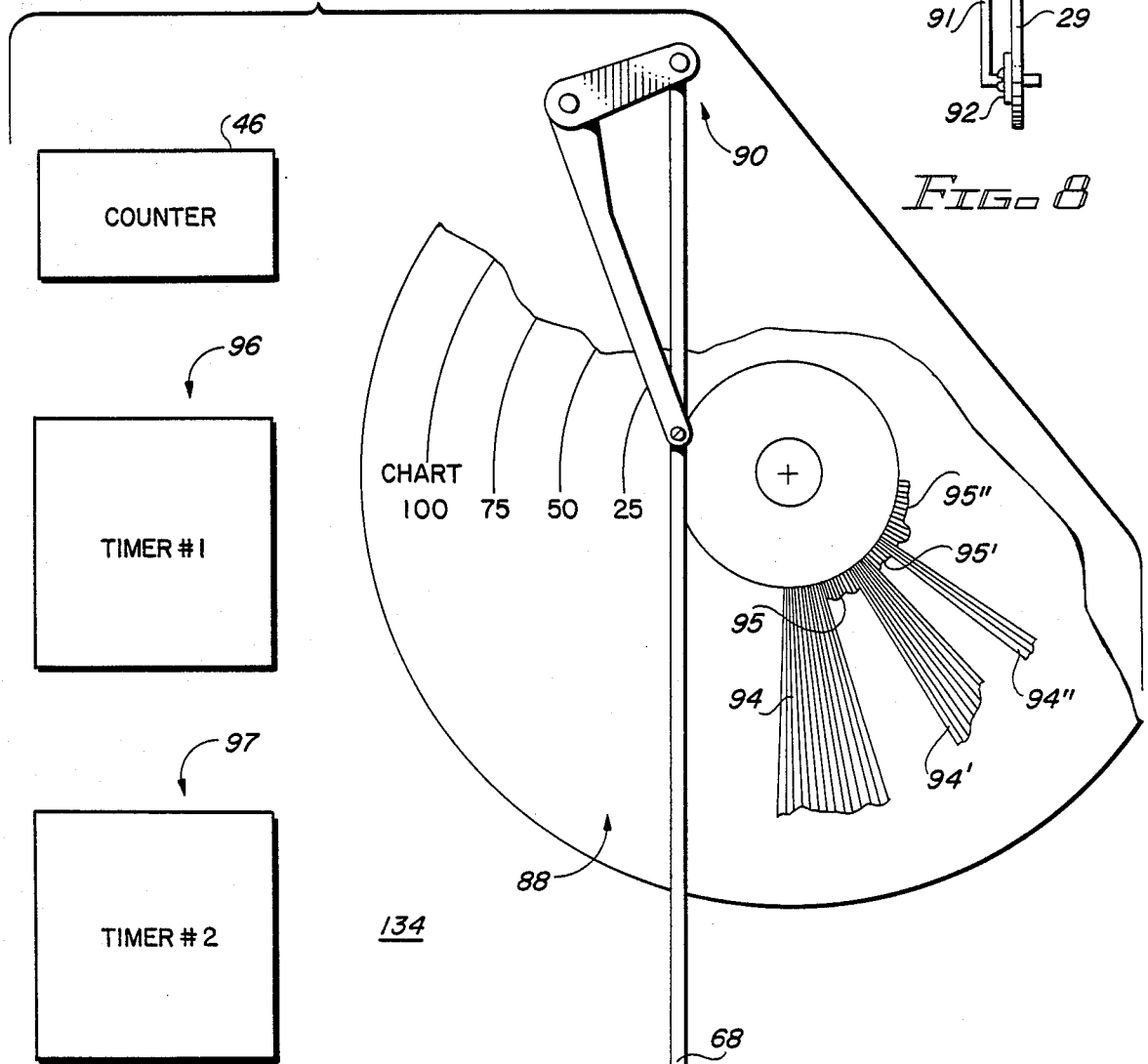
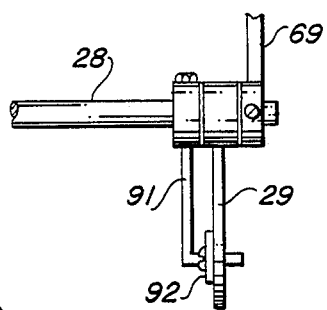
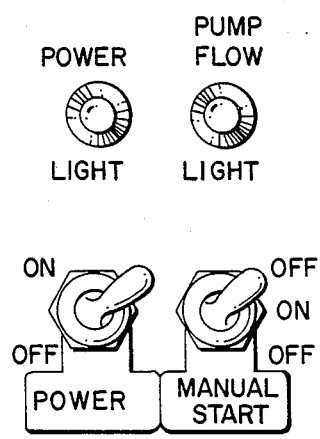
FIG. 7
FIG. 8

PUMP-OFF CONTROL FOR A PUMPJACK UNIT

BACKGROUND OF THE INVENTION

Pumpjack units are well known and have been provided with numerous different control apparatus for shutting in the pumpjack whenever a pump-off or fluid pounding condition is encountered by the downhole pump. Some of these prior art devices operate by weighing the bridle, as shown in Mills U.S. Pat. No. 4,363,605 for example; and other control devices are connected to sense slight movement or vibration of various structural components of the pumpjack unit as shown in Mills U.S. Pat. No. 4,631,954. All of these prior art control devices shut-in the well whenever fluid pounding is encountered. There are still other control devices that measure the operating variables of the electric motor that drives the pumpjack, as shown in Gibbs U.S. Pat. No. 3,951,209, and create an operating signal for shut-in. There are a multitude of flow control and flow measuring devices known to those skilled in the art for sensing the flow through a flow line, as evidenced by the following U.S. Pat. Nos. 2,293,574; 3,299,817; and 4,499,347.

The present invention constitutes an improvement over the prior art by the provision of a flow control device placed in a flow line and arranged to sense each flow produced by each reciprocation of the downhole pump. This cyclic flow is used to reciprocate a flow responsive member in proportion to the magnitude of the cyclic flow. When the member is displaced less than a predetermined amount a sensor associated therewith causes the well to be shut-in.

SUMMARY OF THE INVENTION

This invention comprehends a flow responsive device which is connected into a flow line downstream from a reciprocating pump, such as for example a pumpjack unit, wherein the pump effects flow for a short time interval followed by a no flow condition for another short time interval during each cycle of operation thereof. The apparatus of the present invention comprises an orifice or flow restriction placed in the flow line, with there being a bypass around the orifice. The orifice and the bypass are arranged whereby a limited amount of fluid and gas can flow through the orifice at very small production rates, but at large or normal production rates the flow is forced to flow through the bypass.

The bypass has a spring loaded reciprocating member slidably mounted therein and arranged to be moved against the force of the spring in direct proportion to the magnitude of flow through the bypass. The movable member is connected to actuate a switch means when displaced a predetermined amount. The movable member also is connected to drive a chart pin, and to move a flow indicator which indicates the quantity of fluid flowing through the bypass, and to a counter which records each reciprocation of the member.

Circuitry is included by which the pumpjack motor controller is de-energized whenever the switch means indicates that less than a predetermined amount of fluid flows through the bypass during a finite number of cycles.

More specifically, the pumpjack motor is arranged to be started at predetermined intervals of time. A time delay device permits the motor to run a sufficient length of time for the pumpjack unit to stroke the downhole pump a plurality of reciprocations, thereby producing fluid and causing fluid to flow through the bypass of the invention whenever ample fluid is present downhole. Should an inadequate amount of fluid be produced during this first interval of time, the apparatus of the present invention causes the motor controller to de-energize the motor and for the pumpjack unit to be shut-in for a predetermined length of time. At the end of this second time interval, the motor controller again starts the motor and reciprocates the downhole pump for the before recited predetermined number of reciprocations. Accordingly, at any time while the pumpjack unit is producing the well, should the production fall below a predetermined quantity for a predetermined number of strokes, the well will be shut-in for a predetermined interval of time.

A primary object of the present invention is the provision of a pump-off control for a reciprocating pump.

Another object of the present invention is the provision of a control apparatus for controlling the motor of a reciprocating pump, wherein the pump produces a fluctuating flow of fluid through a flow line, with there being a flow responsive apparatus in the flow line which shuts-in the pump motor whenever said fluctuating flow is less than a predetermined quantity.

A further object of this invention is the provision of apparatus for measuring flow each reciprocation of a pump, and which shuts-in the pump any time the flow is less than a predetermined value.

Another and further object of the present invention is the provision of a method of controlling a pumpjack unit by measuring the production rate each reciprocation of the downhole pump and shutting-in the pump whenever the production rate during a stroke falls below a predetermined amount.

These and various other objects and advantages of the invention will become readily apparent to those skilled in the art upon reading the following detailed description and claims and by referring to the accompanying drawings.

The above objects are attained in accordance with the present invention by the provision of a method for use with apparatus fabricated in a manner substantially as described herein.

BRIEF DESCRIPTION OF THE DRAWINGS

FIG. 4 is an elevational, part cross-sectional view of another form of the present invention;

FIG. 5 is an elevational, longitudinal, part cross-sectional representation of another embodiment of the present invention;

FIG. 6 is a part cross-sectional view taken along line 6—6 of FIG. 5;

FIG. 7 is a top plan view of part of a control panel which forms part of the present invention;

FIG. 8 is a broken, side elevational view of a detail of FIG. 7;

DETAILED DESCRIPTION OF THE PREFERRED EMBODIMENTS

Figure 1:
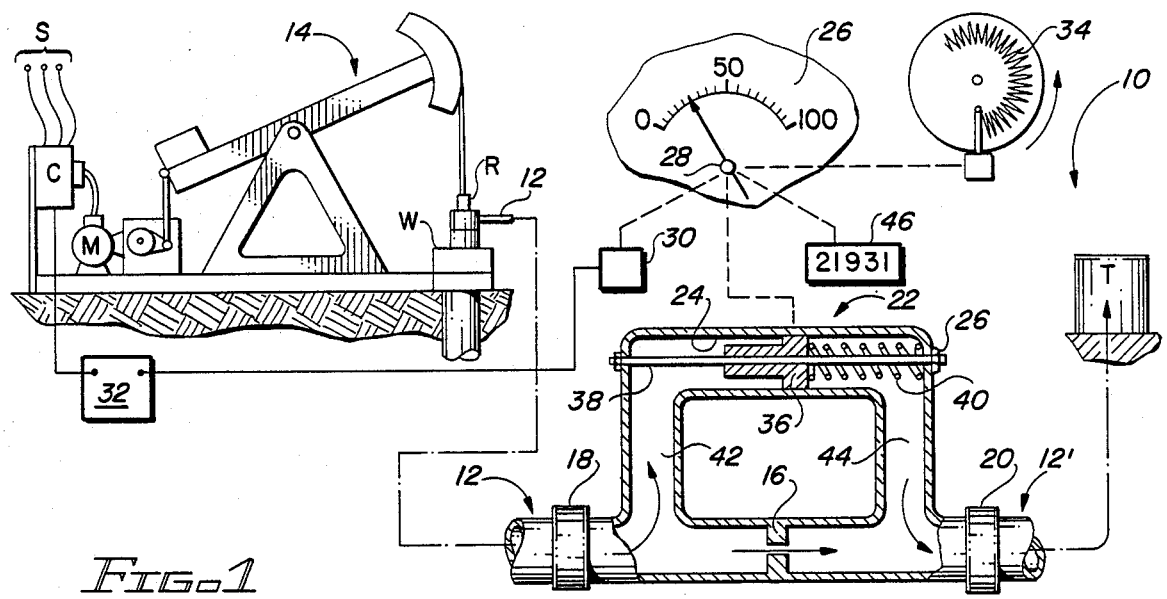
FIG. 1 is a part diagrammatical, part schematical, broken, part cross-sectional, representation of a pumpjack unit that includes apparatus made in accordance with the present invention.

In FIG. 1 of the drawings, there is disclosed a flow control apparatus 10 made in accordance with the present invention. The apparatus 10 includes a flow line 12, 12' connected to wellhead W so that produced fluid from the well is accumulated in tank T. A pumpjack 14 reciprocates a string of sucker rod located within the well W in the usual manner. The pumpjack unit is actuated by motor M that is controlled by the action of starter C which receives current from source S.

The flow control apparatus 10, made in accordance with the present invention, has an orifice 16 located within flow line 12, 12'. Flanges 18, 20 provide a means by which apparatus 10 can conveniently be connected in series relationship within the flow line 12, 12'. The apparatus 10 includes a bypass 22 having passageway 24 formed therethrough so that flow can bypass the orifice 16.

Scale 26 is spaced radially from indicator shaft 28. The shaft 28 is arranged to contact and move a switch means 30 which is actuated in response to shaft 28 oscillating a predetermined amount. Controller 32 is connected to energize the motor starter in response to actuation of the switch 30, as will be discussed more fully later on.

A chart 34 is connected to record the magnitude of each movement of shaft 28.

A flow responsive movable member in the form of a spool 36 is reciprocatingly received within bypass passageway 24. The spool is slidably received on a support shaft 38 which is axially aligned with the spool and with the passageway 24.

Biasing means in the form of spring 40 urges the spool in an upstream direction of the bypass 22. Riser 42 is connected to the upstream side of orifice 16 while downcomer 44 is connected to the downstream side thereof. Counter 46 is connected to count the number of oscillations of shaft 28 which is also the number of strokes of spool 36.

Figure 2:
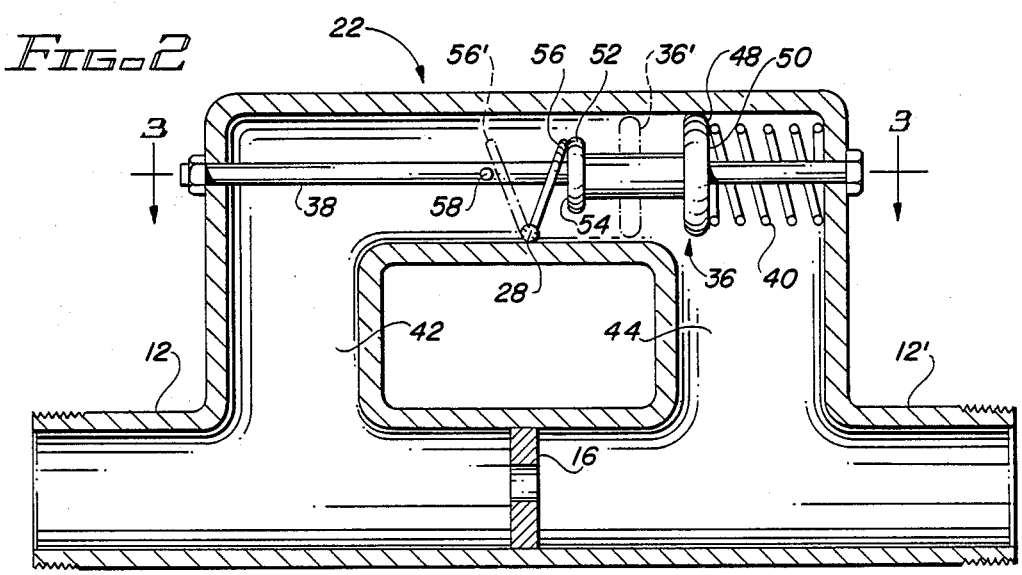
FIG. 2 is a part cross-sectional representation of part of the apparatus disclosed in FIG. 1.
Figure 3:
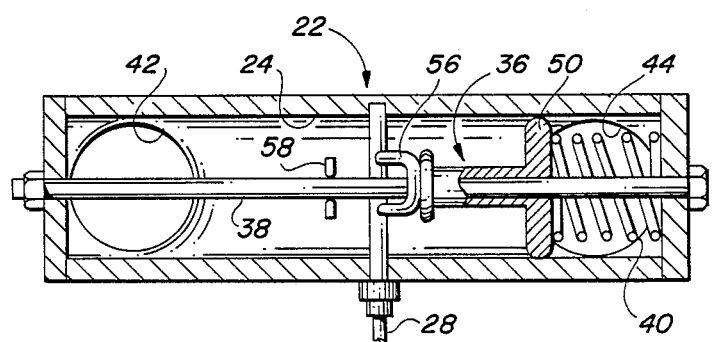
FIG. 3 is a cross-sectional view taken along line 3—3 of FIG. 2.

FIGS. 2 and 3 more specifically set forth some additional details of the apparatus 10, wherein the spool 36 is seen to include an enlargement 48 thereon that terminates in a face 50; and a boss 52 that terminates in a face 54. The faces 50, 54 are opposed to one another, with the face 50 engaging one end of spring 40 while the face 54 abuttingly engages a U-shaped linkage 56.

The U-shaped linkage 56, as seen in FIGS. 2 and 3, forms a yoke about shaft 38 and has the terminal ends thereof attached to shaft 28; and, is moved by face 54 of spool 36 from the position at 56 into the dot-dash position seen at 56'. Stop means 58 is shown as a pin placed laterally through shaft 38 for the purpose of limiting the rearward travel of the spool and linkage 56.

As best seen in FIG. 4, together with other figures of the drawings, the scale 26 has an indicator part 60 that includes indicia formed thereon and is arranged respective to pointer 62 whereby rotation of lateral shaft 20 provides an indication of the magnitude of flow through the bypass. In FIG. 5, together with FIG. 6, blade 64 is attached to actuate switch 30 as the blade is pivoted toward and away from the switch body. Linkage 66 is connected between pointer 62 and counter body 46 so that each oscillation of shaft 28 is counted. Chart drive 68 can be connected to suitable linkage associated with a chart 34 as seen in FIG. 1 in order to record the magnitude of each oscillatory movement of shaft 28 over a long period of time. That is, the chart records the magnitude of the cyclic flow.

In FIGS. 5 and 6, numerals 70 and 72 indicate spaced apart overlapping bolt circles by which the apparatus 110 is maintained in assembled relationship. The bolt circle is formed through the illustrated flanges 74 and 76 which are secured together with bolts in the usual manner. Numeral 78 indicates a cavity which receives a marginal end of the before mentioned spring 40 therein. Boss 82 is affixed to the shaft 28 and includes the illustrated extension which is positioned to engage the free end of the before mentioned pivotal blade member 64 of switch 30.

In FIG. 6, the shaft 28 has one end 28' received within a counterbore 83 formed within the main housing, with a medial length of the shaft being received within a bushing 84. The bushing 84 is threadedly received within the housing and includes the illustrated seals thereon for sealing the passageway 85. As seen in FIG. 5, a return spring 86 urges the shaft 28 to rotate the U-shaped linkage 56 against the face 54 of spool 36 so that the linkage 56 always rides against the spool face for all positions of travel.

Figure 9:
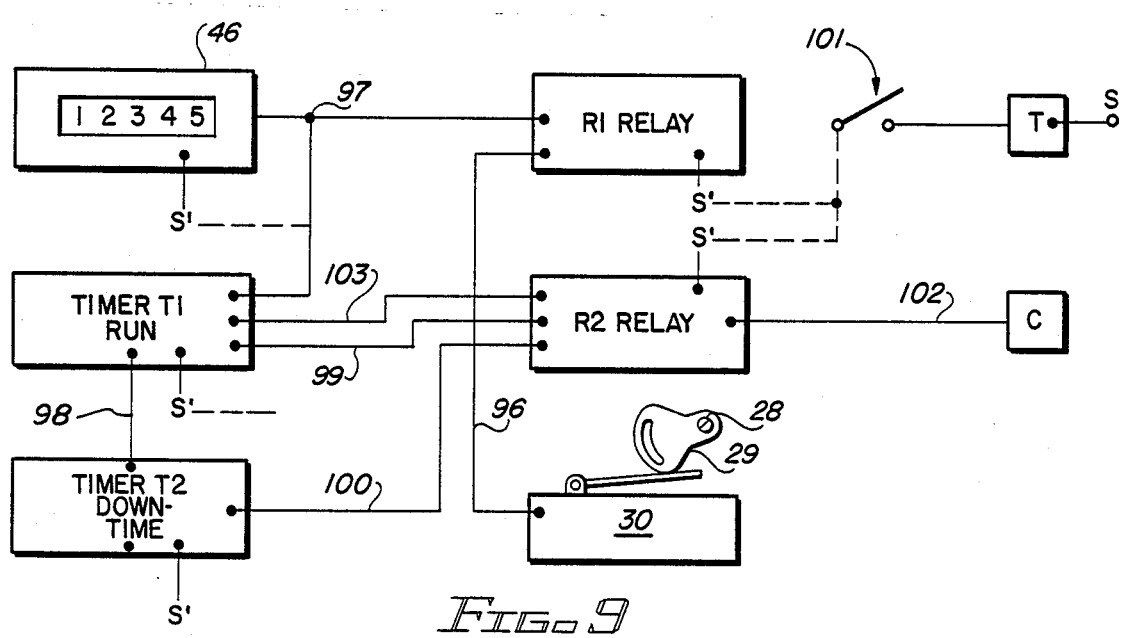
FIG. 9 is a diagrammatical representation of the invention.

FIG. 7 sets forth an alternate embodiment of the present invention, wherein numeral 134 is representative of a control panel that contains circuitry for controlling the motor of the pumpjack. As seen in FIGS. 7-9, and in particular FIG. 7, the counter 46, chart 88, and chart drive linkage 90 are contained within a single panel 134, along with the circuitry, which is more fully set forth in FIGS. 9 and 10.

In FIG. 7, together with FIG. 9, shaft 28 is actuated in the manner disclosed in conjunction with FIGS. 2, 5, and 6. The shaft 28 has attached thereto a freely rotatable adjustment member 29, and a pin operating linkage 69 is directly connected from shaft 28 to operate lever 68. The pivotally arranged arm 91 has a short lateral part formed at the free end thereof which is slidably received within crescent shaped slot 93. Adjustment 92 can be moved along slot 93 so that actuator 29 engages lever 64 of micro-switch 30 to actuate the switch at predetermined quantities of flow in accordance with the selected location of the adjustment 92.

Numerals 94, 94', 94" are different groups of a number of lines drawn on the chart by the pin, and each group 94 indicates a plurality of pump strokes which are of a greater magnitude than the pump strokes seen at 95, 95' 95". The strokes at 94 actuate the switch 80 and hence the counter 46, while the strokes at 95 do not.

In FIG. 9, the transformer T is connected to a suitable source of current S and provides the relays R1, R2; timers T1, T2; and counter 46 with a suitable source of current. Timer T1 is set to run for a plurality of strokes, usually for one minute. Timer T2 is set for a down time of approximately one-half hour. Relay R1 of FIG. 9 energizes junction 97 each time micro-switch 30 is closed by proper rotation of shaft 28. This energizes counter 46 and simultaneously resets timer T1. The pumpjack strokes about 8 strokes per minute, so each stroke requires about eight seconds, and therefore timer T1 is reset each 8 seconds and can never time out so long as the pump strokes with a full barrel, or a magnitude such as seen at 94 on the chart.

Timer T1 is connected to Timer T2 and relay R2. Should the pump stroke with less than the set production rate seen at 94 in FIG. 7, the member 29 will not actuate switch 30 and this causes the timer T1 to commence to time out. When T1 times out at the end of one minute, this causes timer T2 to be reset at 98, while relay R2 is de-energized at 99, thereby de-energizing the pumpjack motor controller C at 102. The pumpjack is now shut-in for the selected downtime, which is selected to provide the necessary time for the downhole reservoir to replenish the formation fluid in the borehole.

At the end of the downtime, timer T2 energizes relay R2 at 100. This energizes the motor controller C by means of conductor 102, resets T1, and energizes relay R1 along conductor 96 which resets timer T1 which in turn again commences to time out in the above described manner.

Figure 10:
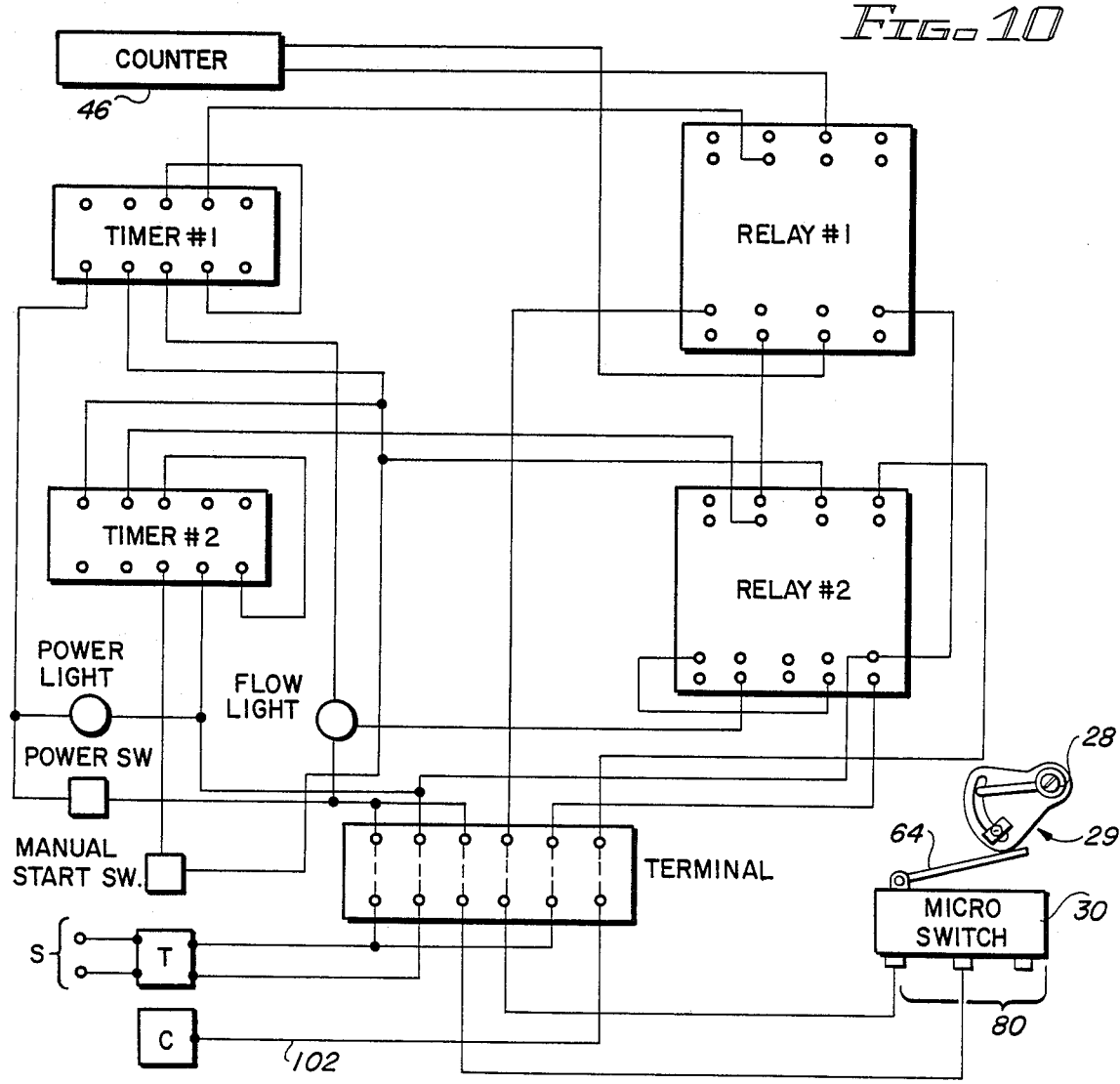
FIG. 10 is a schematic representation showing the details of FIG. 9.

Timers T1 and T2 are model H3CA solid state timers, manufactured by Omron Tateisi Electronics Company having eight operational modes including a reset input, start input, gate input, and check input. The time limit operation is selectable. The counter 46 is an Omron counter H7EC. The relays R1 and R2 are Poter Bromfield 24 volt relays KHS17A11. These timers and relays are connected as seen in FIG. 10.

OPERATION

In operation of the apparatus illustrated in FIG. 1, a well W is being produced by a pumpjack 14 so that produced fluid flows at flow conduit 12 each reciprocation of the illustrated polished rod R. This cyclic pumping provides a fluctuating flow comprised of about 5–15 flows or slugs of fluid through the piping 12, 12' each minute, because each upstroke of the pumpjack unit provides one flow. Therefore, when fluid is moved by each upstroke of the pumpjack unit, the force of the fluid flowing across the spool 36 moves the spool downstream against the spring 40, thereby oscillating shaft 28 an amount to cause indicator 62 to move from 62 of FIG. 5 to 62', or "0" to about "85" on scale 26.

Oscillation of shaft 28 within the operating range trips the counter 46 one digit, records the magnitude of the oscillation at 34, and moves the blade 64 that actuates switch 30. The switch generates a signal if it is set to be actuated by the range of movement imparted into the spool.

The motor M of the pumpjack unit 14 is also cyclically energized but at much greater time intervals. The pumpjack unit reciprocates the downhole pump for whatever length of time is required for the downhole reservoir to be lowered until the fluid level is at an elevation which results in less than a full pump barrel being produced each pump stroke. This is the beginning of a pump-off condition which results in the apparatus of the present invention causing the pump to be shut-in for a predetermined amount of time. This down time is set to a selected value depending upon the production history of the well. After the well has been shut-in for the required amount of time found necessary for the downhole reservoir to again be filled with liquid, the pump will again commence pumping until the apparatus of the present invention again shuts-in the well. This operation continues with the pump being started 2–4 times per hour depending upon the downhole characteristics of the production formation of the particular well.

Control circuitry 32 causes the starter C to connect the motor M to a source S of suitable current, usually 3-phase current for a special high slip motor M. The motor drives the gear box which in turn rocks the illustrated walking beam and reciprocates the bridle and polish rod of the pumpjack unit, thereby stroking the downhole pump. After the first few initial strokes of the polish rod R, the downhole pump will be producing with a full barrel and forcing large slugs of produced fluid through the pipeline 12. A small quantity of the produced fluid flows through the orifice 16, and a large quantity flows through the bypass 22 of the present invention. When the motor is running and ample fluid is available, each reciprocation of the downhole pump causes the spool 36 to move full range, that is, within the range of travel indicated by the full line position of spool 36 of FIG. 2 and the dot-dash position at 36'. This also is within the range indicated by 62, 62' of FIG. 5 of the pointer 62. This action is recorded on the chart 34, counted by counter 46, and trips switch 30.

The switch 30 is adjusted at 65 to cause blade 64 to trip the switch 30 when the pointer 62 moves from the full line "0%" position of the pointer 62 of FIG. 5 to the predetermined "85%" dot-dash position 62'. This is about 85% of flow, and is achieved by judicially selecting the orifice 16 and setting the adjustment screw 65 so that the switch 30 is actuated when shaft 28 rotates pointer 62 into position 62'. Position 62' is therefore approximately 85% of the pump full barrel flow. Stated differently, the pointer 62 is set respective to scale 26 whereby when the downhole pump moves a full barrel of fluid, the pointer 62 is aligned with numeral 100. As the downhole pump commences to pump-off, that is, the fluid level in the wellbore annulus is lowered below the pump intake, causing less than a full barrel to be produced, the spool 36 will be moved a corresponding less amount of travel. Therefore, the switch 30 will not be actuated at less than 85% of production, for example, since this value has been selected for the lower limit of its minimum operating range. This is an arbitrary selected value that can be changed depending on how many strokes the pumpjack unit makes to achieve full production after encountering a pump-off condition. It is usually desirable to select a value between 70 and 97 percent for tripping the switch.

After the well has been shut-in for a selected down time, in order to allow the reservoir to recuperate, the timer of controller 32 times out and takes the appropriate action to cause the starter C to energize motor M. Electrical circuitry for achieving this action is within the comprehension of those skilled in the art. The controller 32 will now permit the downhole pump to reciprocate a few strokes and then will again de-energize the motor unless the switch 30 has been actuated in the meanwhile in response to movement of spool 36 to its present range 62', or higher. In the unlikely event the pump fails to move fluid at a satisfactory rate of production within the first few strokes of operation, the well is again shut-in for another down time. Usually the well starts and after a few strokes commences producing at an acceptable production rate, whereupon the controller 32 maintains the motor M energized until a pump-off condition is again encountered; that is, spool 36 fails to trigger switch 30.

The magnitude of the pump-off condition can be selected by adjusting the response of switch 30 respective to the movement of spool 36. The spring characteristics is selected along with the spool diameter, the inside diameter of the passageway 24, and the diameter of the hole in the orifice plate. Those skilled in the art, having fully digested this disclosure, will be able to select these variables in order to carry out the present invention.

The present invention provides unexpected results in the form of a controller for a reciprocating pump; and, provides improvements which overcomes many of the drawbacks associated with prior art pump controllers. The circuitry can be arranged to start the well after a predetermined downtime, and then to continue producing the well only when the pump achieves satisfactory production within a predetermined or selected first few strokes upon start up. The well continues to produce fluid so long as each individual stroke thereof produces an acceptable quantity of fluid. When the production rate measured for each stroke fails to produce a finite quantity of fluid for a finite number of strokes, the well is shut-in for a selected interval of time in order to enable the well to recuperate and then production is resumed.

In operation of the embodiment disclosed in FIGS. 7-10, assuming that the well is pumping and that the percenter adjustment 92 is set for 80%, each stroke of the well will stroke the spool 36 against spring 40. This rotates the shaft 28, which in turn moves lever 91 along the crescent slot 93 until it abuts the percentage adjustment 92, whereupon, the plate member 29 will rotate counterclockwise against lever 64, thereby actuating micro-switch 30. Timer T1 is set for one minute, while down timer T2 is set for thirty minutes. The well strokes seven strokes per minute and accordingly, the micro-switch 30 resets timer T1 almost nine times a minute. This action maintains relay R2 energized. The system continues to operate and produce fluid in this manner until a pump-off condition is encountered downhole in the borehole, as seen at 95 in FIG. 7, for example. At the end of about seven strokes, each of which are of a magnitude less than 95 and therefore fail to actuate micro-switch 30, timer T1 times out because one minute has gone by with no signal being generated at 80. This interrupts the circuitry at 99 of FIG. 9, causing relay R2 to cause conduit 102 leading to the well or motor controller C to de-energize the pump motor. At the same time, timer T2 is reset and commences its time cycle which may be set for one-half hour for example. Accordingly, the pumping action is interrupted until timer T2 reaches the end of the selected downtime of thirty minutes, whereupon, conductor 100 energizes relay R2, which energizes the motor controller C by means of conduit 102. This action simultaneously resets run timer T1 by means of conductor 103, thereby providing one minute in which to develop a full barrel stroke. Should the well fail to develop sufficient flow to actuate micro-switch 30 during this run time of one minute, timer T1 will again reset timer T2, which in turn causes relay R2 to again be energized, and the motor of the pumpjack unit will not restart so the well again remains dormant for another downtime of one-half hour, for example.

The run time and the downtime can be selected according to the operational characteristics of the particular well being controlled by the apparatus of this invention.

Enclosed herewith is a data sheet on the model H3CH solid state timer used at T1 and T2 in the disclosure.

Accordingly, regardless of the reason for unfavorable production, the present invention will shut-in the well anytime the cyclic flow therefrom is unacceptable. This new and unforeseen method of operation of a pumpjack unit can be made to shut-in the pumpjack unit before the fluid pounding reaches a magnitude considered harmful to the associated well equipment. Moreover, the present invention provides a means by which exact measurement of the fluid flow from the well is recorded at 34. The number of strokes counted at 46 can be reconciled with the cyclic flow measured at 34 to thereby closely approximate the quantity of produced fluid stored at T. The occurrence of a malfunction of the well equipment is readily evidenced by studying the stored data at 34 and 46.

I claim:

1. In a downhole pump that is reciprocated by a pumpjack unit to provide a flow of fluid through a flow line each upstroke of the pump, a prime mover for said pumpjack unit, a controller for starting and stopping said prime mover, a method of controlling the operation of said pumpjack unit comprising the steps of:

placing an orifice in said flow line and connecting a bypass around said orifice, sizing said orifice so that when said pump upstrokes and establishes a flow of fluid, the fluid flow is divided with part of the fluid flowing through said orifice while simultaneously the other part of the fluid flows through said bypass;

placing a movable member within said bypass and biasing the member in an upstream direction; said member being responsive to rate of flow; and, using the magnitude of the flow through the bypass for reciprocating said movable member an amount which is proportional to the quantity of fluid produced by one pumping stroke of said downhole pump;

connecting circuitry to said controller to energize said prime mover for a first time interval and to thereafter deenergize said primer mover for a second time interval; and, then to energize said primer mover for another said first time interval;

selecting the relative size of the member, bypass, the biasing force, and orifice to displace said member downstream against the biasing force when flow occurs through said bypass each full barrel stroke of the downhole pump, connecting said member to produce a signal in response to each movement of the member which is of a selected magnitude;

connecting said signal to reset said first time interval each time said movable member is moved a predetermined amount in response to flow through said bypass; so that said first time interval is never exceeded so long as said movable member continues to reset said first time interval; whereby; said controller continues to supply current to the prime mover;

starting said prime mover and running said pumpjack unit so long as the flow each upstroke of the pump moves the movable member said predetermined amount;

shutting in the pump for said second time interval whenever the movable member is displaced less than said predetermined amount for a period of time equal to said first time interval, said pump is shut-in for said second time interval; whereby:

said pumpjack unit, when started, runs a plurality of strokes and then discontinues the operation of the pumpjack unit unless said first time interval is reset during said pluarlity of strokes.

2. The method of claim 1 and further including the steps of;

selecting a rate of production for flow through said flow line;

connecting a switch means to be actuated by said member being reciprocated downstream against said biasing force an amount related to the selected rate of production; and, resetting said first time interval each time said member is moved said amount related to the selected rate of production.

3. The method of claim 1 and further including the following steps:

energizing the controller to start said unit at the end of said second interval of time;

runnng said unit for said first interval of time and stopping said unit at the end of said first interval unless said movable member is actuated by said selected magnitude of flow.

4. The method of claim 1 and further including the steps of connecting said movable member to actuate a recorder and thereby store data related to the operation of the pumpjack unit.

5. The method of claim 1 and further including the steps of connecting said member to actuate a counter for counting the number of strokes made by said member.

6. In a controller that energizes a prime mover connected to power a reciprocating pump for producing flow through a flow line each pumping stroke thereof, said pump has an intake connected to a source of liquid which first flows at a high value and thereafter diminishes over a period of time to cause said pump to produce a flow at a low value, and after a dormant period of time again flows at a high value, a condition responsive apparatus in combination with said controller, prime mover, and reciprocating pump for de-energizing the prime mover whenever the pump is producing at the diminished rate of production;

a flow restrictor in said flow line and a bypass connected in parallel with said flow restrictor whereby the produced flow is divided between the flow restrictor and the bypass each said pumping stroke;

said condition responsive apparatus includes a member connected to move in said bypass in response to each flow produced by said pump and to provide a signal whenever said member is moved an amount indicative of a high production rate;

a first timer means connected to cause said controller to energize said prime mover for a first time interval and stop said prime mover at the end of said first time interval;

means connecting said first timer means to be reset by said signal of said condition responsive apparatus;

means connecting a second timer means to cause said controller to start said prime mover at the end of a second time interval, and means by which the prime mover is run for a plurality of pumping strokes in order for the pump to achieve an operation which is representative of a full barrel stroke;

said first time interval being of a value which is equal to the time required for said pump to make a multiplicity of strokes;

said second time interval being of a value which is equal to a multiplicity of said first time intervals;

means actuating said second timer when said first timer causes the controller to de-energize said prime mover; and, means actuating said first timer when said second timer has timed out and said controller has energized said prime mover.

7. The condition responsive apparatus of claim 6 wherein said movable member is received within said bypass, means mounting said movable member for movement between full and diminished flow and using said movable member to actuate a circuit means which provides said signal.

8. The condition responsive apparatus of claim 7 wherein means, including circuitry, is connected to said controller and to said movable member for starting said pump and running said pump so long as flow therefrom is at a high production rate; and, for stopping said pump when flow therefrom is at a low production rate.

9. In an apparatus having a motor which reciprocates a pump and produces a flow through a flow line each upstroke thereof, said flow is relatively large when the pump is properly supplied with fluid and relatively small when a pumpoff condition is about to be encountered, said motor having a controller which starts the motor when the controller is actuated, the improvement comprising:

a pump-off control apparatus for de-energizing said motor whenever a pump-off condition is about to be encountered by said pump; said control apparatus includes a flow resistor in said flow line, a bypass means by which fluid flow from the pump is divided with part of the fluid circumventing said flow restrictor; a movable member reciprocatingly received within said bypass means; means by which said movable member is arranged to reciprocate one stroke in response to fluid flow produced by each upstroke of the pump; said movable member is moved downstream a distance proportional to the quantity of fluid produced each upstroke of said pump;

signal means connected to be actuated only when said movable member is moved an amount indicative of a relatively large flow; whereby, the signal means is not energized when said movable member is moved an amount representative of a relatively small flow;

said control apparatus includes a first timer means, a second timer means, and means including circuitry by which said motor controller starts said motor and runs said motor for a first time interval, and then stops said motor for a second time interval, and again starts said motor for another first time interval; said signal means resets said first time interval whereby said controller continues to maintain said motor energized unit said movable member is moved an amount indicative of said small flow and thereby fails to generate said signal means; said control apparatus starts said motor at the end of said second time interval and again runs said motor so long as said signal means is generated in response to the recited movement of said movable member.

10. The apparatus of claim 9 wherein said movable member is connected to actuate a recorder to thereby store data related to the operation of the pumpjack unit.

11. The apparatus of claim 9 wherein said member is connected to actuate a counter for counting the number of strokes made by said member.

12. The apparatus of claim 9 wherein said member is connected to actuate a recorder which stores data related to the operation of the pumpjack;

said signal means is actuated in response to the magnitude of the stored data that is recorded.

* * * * *